(12) United States Patent
Young (10) Patent No.: US 7,151,540 B2
(45) Date of Patent: *Dec. 19, 2006

(54) AUDIENCE ATTENTION AND RESPONSE EVALUATION

(75) Inventor: Charles Young, Albuquerque, NM (US)

(73) Assignee: Hello Hello, Inc., Albuquerque, NM (US)

( * ) Notice: Subject to any disclaimer, the term of this patent is extended or adjusted under 35 U.S.C. 154(b) by 895 days.

This patent is subject to a terminal disclaimer.

(21) Appl. No.: 09/870,201

(22) Filed: May 29, 2001

(65) Prior Publication Data

US 2001/0048439 A1 Dec. 6, 2001

Related U.S. Application Data

(60) Provisional application No. 60/208,001, filed on May 26, 2000, provisional application No. 60/208,003, filed on May 26, 2000, provisional application No. 60/208,004, filed on May 26, 2000.

(51) Int. Cl.
G06T 15/70 (2006.01)

(52) U.S. Cl. .............. 345/473; 345/474; 345/475; 705/10; 705/12; 725/9; 725/10; 725/13; 725/14; 725/16; 725/39; 725/46

(58) Field of Classification Search ............ 345/440, 345/440.2, 473, 474, 475; 725/9, 11, 12, 725/34, 35, 13, 16, 10, 14, 39, 46; 700/91, 700/108; 705/10, 18, 12; 434/237, 238
See application file for complete search history.

(56) References Cited

U.S. PATENT DOCUMENTS

| | | | | |
|---|---|---|---|---|
| 4,745,468 A | 5/1988 | Von Kohorn | ............... | 358/84 |
| 4,943,963 A * | 7/1990 | Waechter et al. | ........... | 370/428 |
| 5,243,517 A | 9/1993 | Schmidt et al. | .......... | 364/419.2 |
| 5,855,008 A | 12/1998 | Goldhaber et al. | ........... | 705/14 |
| 5,995,941 A | 11/1999 | Maquire et al. | .............. | 705/10 |
| 6,011,578 A * | 1/2000 | Shatto et al. | ................. | 725/14 |
| 6,088,030 A * | 7/2000 | Bertram et al. | ............. | 345/839 |
| 6,134,531 A | 10/2000 | Trewitt et al. | ................ | 705/10 |
| 6,311,190 B1 * | 10/2001 | Bayer et al. | ............. | 707/104.1 |
| 6,322,368 B1 * | 11/2001 | Young et al. | ................ | 434/236 |
| 6,604,239 B1 * | 8/2003 | Kohen | .......................... | 725/13 |

(Continued)

FOREIGN PATENT DOCUMENTS

WO      WO 01/18723 A2      3/2001

OTHER PUBLICATIONS

"An Analysis of In-game Advertising for NCAA Basketball", Stotlar et al., Jan. 2000, Cyber-Journal of Sport Marketing, pp. 1-9.*

(Continued)

Primary Examiner—Kimbinh T. Nguyen
(74) Attorney, Agent, or Firm—Deborah A. Peacock; Philip D. Askenazy; Peacock Myers, P.C.

(57) ABSTRACT

An automated method of and system for collecting and displaying audience recognition information concerning a video presentation, comprising: displaying a video presentation to a plurality of subjects; inquiring of each of the subjects by computer means whether each of a plurality of still images from the video presentation are recognized by each of the subjects; for each of the images, tabulating a percentage of the subjects reporting recognition of the image in inquiring; and automatically generating by computer means a graph comprising each of the images, wherein a position of each of the images on the graph is determined by the corresponding percentage generated in tabulating.

34 Claims, 7 Drawing Sheets

U.S. PATENT DOCUMENTS

2001/0027410 A1  10/2001  Ueda .......................... 705/10

OTHER PUBLICATIONS

Bolt, Richard A. "Conversing with Computers." Technology Review, vol. 88, Feb.-Mar. 1985, p. 34.

Lohse, Gerald L. "Consumer Eye Movement Patterns on Yellow Pages Advertising." Journal of Advertising, vol. 26n1, Spring 1997, pp. 61-73.

Krugman, Dean M. et al. "Do Adolescents Attend to Warnings in Cigarette Advertising?" Journal of Advertising, vol. 34n6, Nov.-Dec. 1994, pp. 39-52.

Young, C. E. "Research as Teacher: A Heuristic Model for Pre-Testing TV Commercials." Advertising Research located at www.quirks.com, Mar. 2001, pp. 22-27.

Young, C.E. et al. "Visual Connectedness and Persuasion." Journal of Advertising Research, Mar.-Apr. 1992. Located at www.ameritest.org/education/journal/visualconnectedness.htm.

Young, C.E. et al. "The Visual Experience of New and Established Product Commercials." Advances in Consumer Research, vol. 18, 1997, pp. 545-549. Located at www.ameritest.net/education/journal/visualexperience.htm.

Young, C.E. et al. "Video Rhythms and Recall." Journal of Advertising Research, vol. 29, No. 3, Jun.-Jul. 1989, pp. 22-25.

Young, C.E. et al. "Guidline: Tracking the Commercial Viewer's Wandering Attention." Journal of Advertising Research, Jun.-Jul. 1987. Located at www.ameritest.org/education/journal/guidelines.htm.

* cited by examiner

AUDIENCE ATTENTION AND RESPONSE EVALUATION

CROSS-REFERENCE TO RELATED APPLICATIONS

This application claims the benefit of the filing of U.S. Provisional Patent Application Ser. No. 60/208,001, entitled "System for Tracking Audience Response to Advertising", filed on May 26, 2000, U.S. Provisional Patent Application Ser. No. 60/208,003, entitled "Method for Testing Audience Attention and Response to Advertising in the Home or Place of Business from a Distance", filed on May 26, 2000, and U.S. Provisional Patent Application Ser. No. 60/208,004, entitled "Method for Automatically Recording and Displaying Audience Attention to Video", filed on May 26, 2000, and the specifications thereof are incorporated herein by reference.

COPYRIGHTED MATERIAL

A portion of the disclosure of this patent document and of the related applications listed above contains material that is subject to copyright protection. The owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

Field of the Invention (Technical Field)

The present invention relates to evaluation of audience attention and response to advertising in video, printed, and on-line formats.

SUMMARY OF THE INVENTION (DISCLOSURE OF THE INVENTION)

The present invention is of an automated method of and system for collecting and displaying audience recognition information concerning a video presentation, comprising: displaying a video presentation to a plurality of subjects; inquiring of each of the subjects by computer means whether each of a plurality of still images from the video presentation are recognized by each of the subjects; for each of the images, tabulating a percentage of the subjects reporting recognition of the image in inquiring; and automatically generating by computer means a graph comprising each of the images, wherein a position of each of the images on the graph is determined by the corresponding percentage generated in tabulating. In the preferred embodiment, displaying and inquiring are performed on a computer local to each subject, and tabulating and generating are performed on a central computer networked to each local computer. Results of inquiring are preferably communicated to the central computer over the Internet.

The invention is also of an automated method of and system for collecting and displaying audience recognition information concerning a video or graphic presentation, comprising: displaying a video or graphic presentation to a plurality of subjects; obtaining by means local to each subject audience recognition information concerning the presentation from each of the subjects; communicating results of obtaining via network means to a central computer; tabulating results of obtaining for all subjects; and generating by computer means a graph or grid comprising at least one image from the presentation, wherein characteristics of the at least one image are determined by results of tabulating. In the preferred embodiment, displaying and obtaining are performed by World Wide Web browsers and/or interactive television devices. Obtaining comprises inquiring of each of the subjects whether each of a plurality of still images from a video presentation are recognized by each of the subjects, tabulating comprises tabulating a percentage of the subjects reporting recognition of each of the images in inquiring, and generating comprises automatically generating by computer a graph comprising the plurality of images, wherein a position of each of the images on the graph is determined by the corresponding percentage generated in tabulating. Alternatively, displaying comprises displaying a graphic presentation for a duration of less than one minute, obtaining comprises inquiring of each of the plurality of subjects what portions of the presentation are recognized, tabulating comprises determining for each of the portions a percentage of the subjects recognizing the portion in inquiring, and generating comprises automatically generating by computer means the presentation overlaid with a grid, wherein a brightness of portions of the presentation are determined by the results of tabulating.

The invention is additionally of an automated method of and system for collecting in-market audience recognition information concerning a video presentation, comprising: displaying a video presentation to a first plurality of subjects; inquiring of each of the first plurality of subjects whether each of a plurality of still images from the video presentation are recognized by each of the first plurality of subjects; for each of the images, tabulating a percentage of the first plurality of subjects reporting recognition of the image in inquiring; generating a graph comprising each of the images, wherein a position of each of the images on the graph is determined by the corresponding percentage generated in tabulating; after generating, creating an abbreviated presentation containing a subset of the images; after introduction of the video presentation via an advertising campaign, displaying the abbreviated presentation to a second plurality of subjects in a market targeted by the advertising campaign; and inquiring of each of the second plurality of subjects whether the abbreviated presentation is recognized by each of the second plurality of subjects. In the preferred embodiment, creating comprises creating a storyboard comprising still images or an abbreviated video presentation comprising a subset of the video presentation.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Best Modes for Carrying out the Invention

Figure 4:
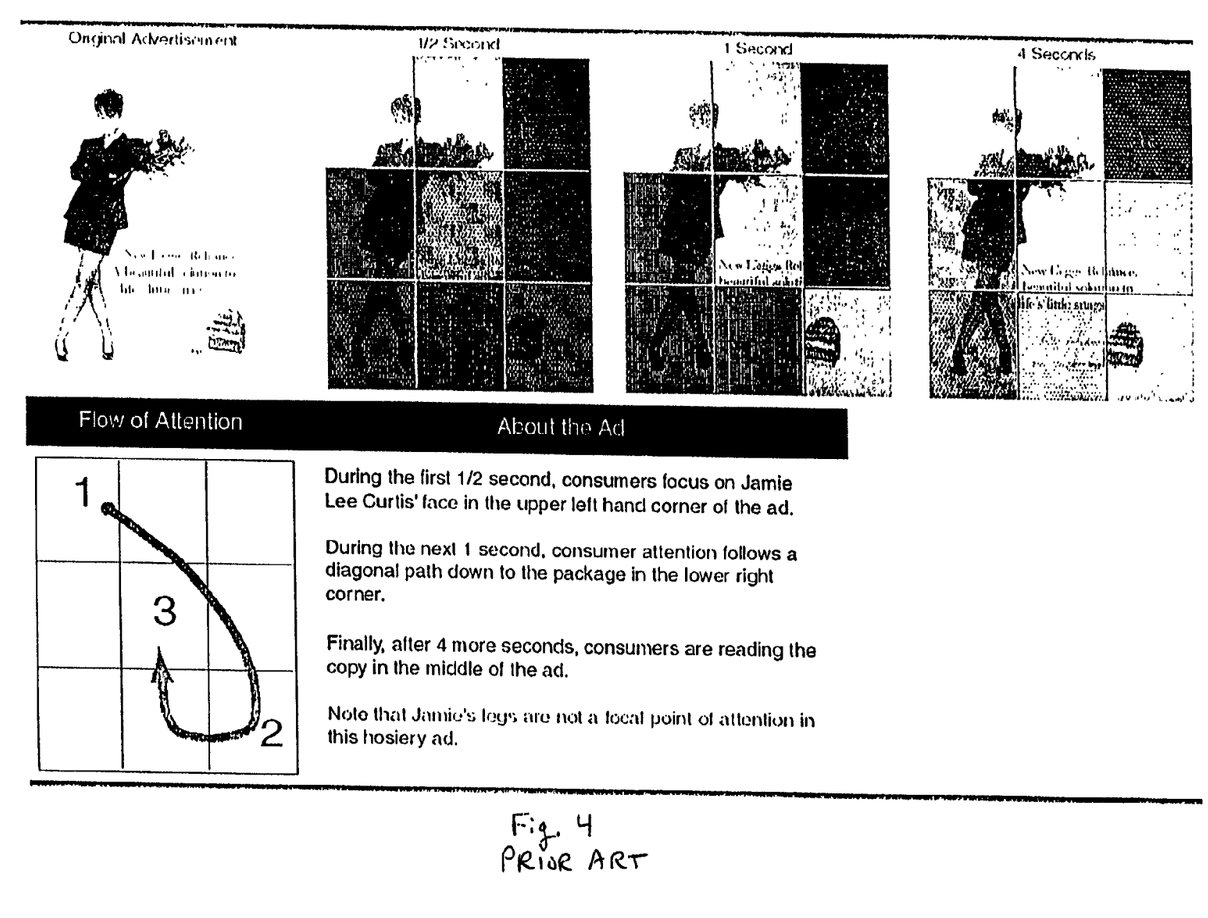
FIG. 4 illustrates another type of Flow of Attention® display for print advertising (prior art)

The present invention is of an automated process and system for measurement and the display of measures of audience attention to motion pictures or video, such as television commercials. The end product of this process is a graphical user interface display of research data referred to by the trademarks Picture Sorts® and Flow of Attention® (see FIG. 2). Hand-collected and produced information displays of this kind (and of the Flow of Attention® display of FIG. 4) have been known in the art from previous efforts of Applicant and licensees.

The automated process of the invention begins with a set of images or key frames taken as a sample of the visual information contained in the video stimulus—i.e., the motion picture or video being researched. The number of pictures is preferably determined by the visual complexity of the video stimulus and is not determined by a mechanical rule or predetermined time sequence. The preferred procedure for sampling the video is to take as many pictures as a skilled judge can distinguish in a meaningful way.

The sample of images taken forms an esthetic "vocabulary" for describing how an audience cognitively processes the visual information embedded in the symbol system of the video. This vocabulary is used to interrogate members of the audience or respondents about the visual experience they had from the video.

Figure 5:
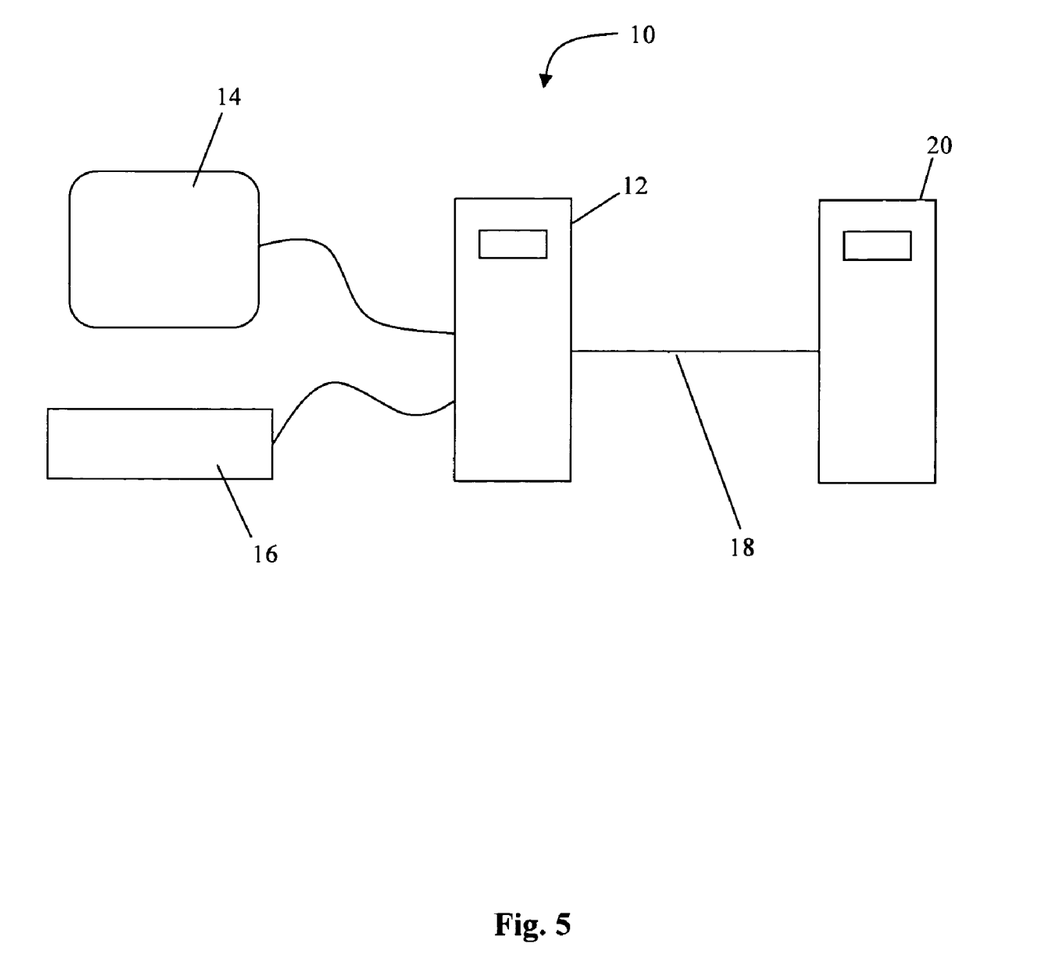
FIG. 5 is a block diagram of the preferred apparatus of the invention.
Figure 6:
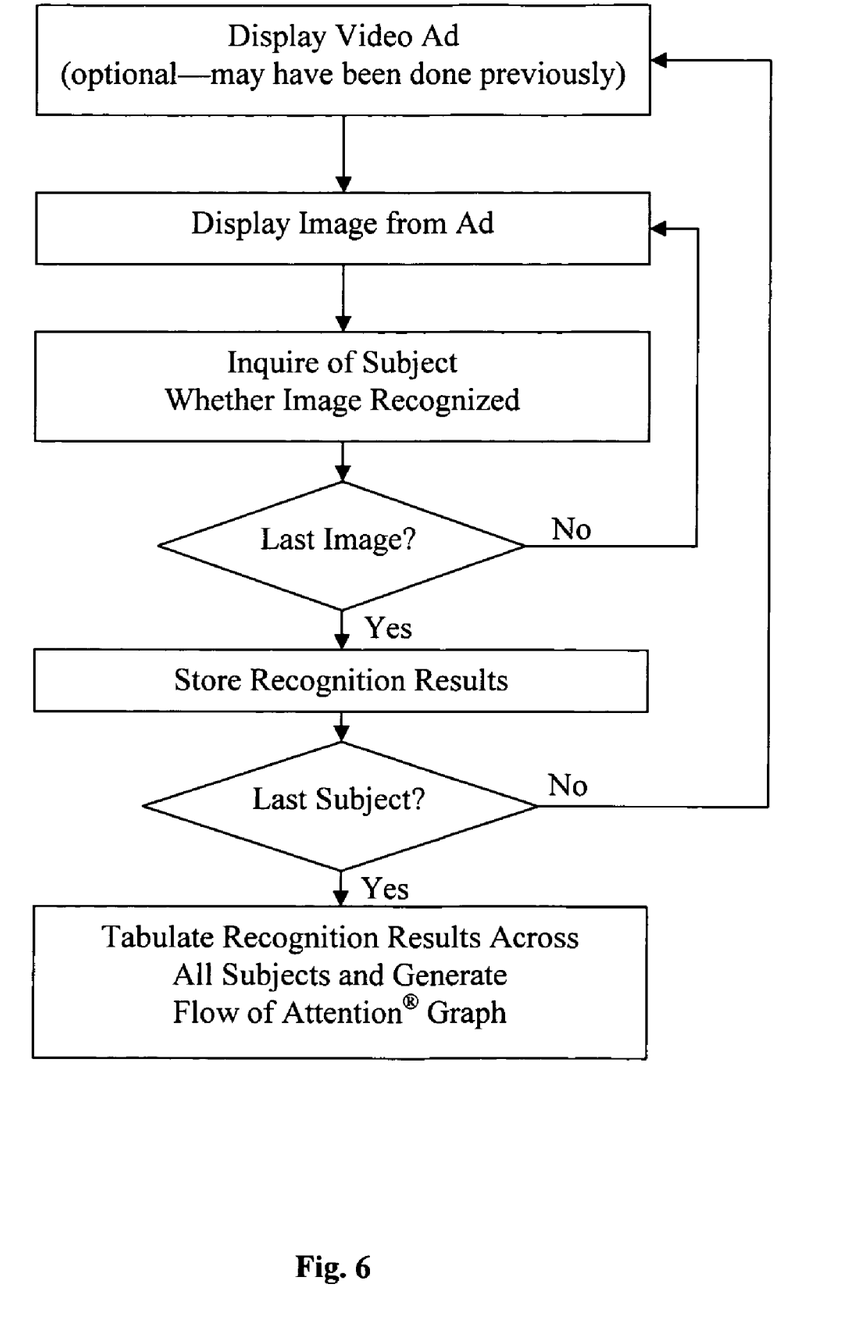
FIG. 6 is a flow diagram of the preferred automated process of collecting and displaying audience attention information according to the invention.

Referring to FIG. 5, in the preferred apparatus of the invention 10 images are brought up automatically, in randomized order, on a computer or television screen 14 and respondents are asked to indicate which pictures or images they recall or do not recall seeing in the video via an input device 16 such as a keyboard or mouse. The image display and results tallying is preferably performed by local computer 12. Alternatively, network-accessible computer 20 can be employed via network connection 18 (e.g., an Internet connection) to generate images and/or tally results from one or more local computers 12. As is readily understood by one skilled in the art, World Wide Web ("web") server and browser software can be employed on computers 20 and 12, respectively. This simple affirmative/negative, non-verbal method allows researchers to reach across language barriers to explore the "esthetic" communication of the video as defined by A. Moles, *Information Theory and Esthetic Perception* (Urbana, University of Illinois Press, 1968). The preferred automated process of the invention is shown in FIG. 6.

The automated process of the invention then uses computer software on local computer 12 and/or network-accessible computer 20 to accumulate responses across different members of the audience to display the results in the form of a Flow of Attention graph. The automated display can be in near real time to the period of data collection and/or be available for subsequent printing, either in electronic or paper form, e.g., for use in a report to the creative managers of the video.

Figure 2:
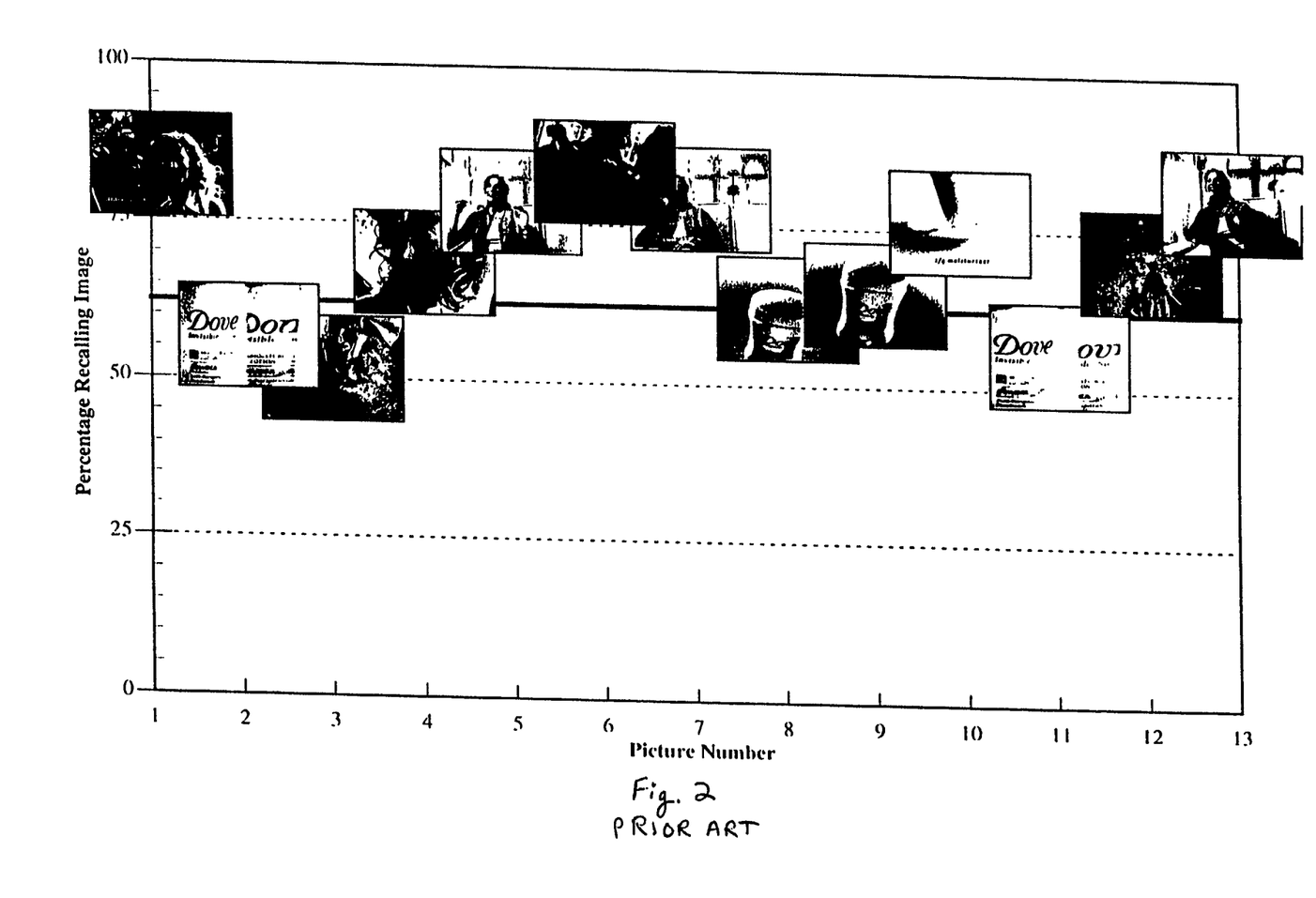
FIG. 2 is a sample Flow of Attention® graph of percentage of an audience recalling an image from a television commercial.

In the automated Flow of Attention® graph of FIG. 2, the pictures are plotted from left to right (on an x-axis) in the order in which they actually appear in the video. The pictures are plotted at different heights on the y-axis, according to the percentage of the audience who recalls that particular image. For the automated process, certain rules for displaying the pictures are used. Preferred rules include, but are not restricted to, the following: a) The height of the picture is measured from the top of the picture, b) X (a parameter) number of pictures will be displayed per screen or page, and c) when two pictures overlap, then the picture with the higher score will be displayed on top if the score is above the average for the set of pictures; but if the score is below the average score, then the picture with the lower score will be displayed on top.

The resulting graph forms a user-friendly interface that can be used by creative managers of the video to better understand how audiences attend to the flow of images in the video. This information may then be used as input to the editing process for optimizing performance of the video.

The invention is also of a method and system for automatically collecting data on audience attention to the esthetic elements comprised in a video communication stimulus, such as a television advertisement or training video, or a graphical communication object, such as a print advertisement or web page.

The object being studied should be viewed as a system of symbols and the object can be deconstructed or decomposed into discrete esthetic elements which can be used to form a natural "vocabulary" for describing and measuring audience members' attention to and response to different elements of the symbol system of the communication object.

In the case of a video stimulus, the vocabulary that is created to describe the system of symbols are visual frames as a sample of the total visual information content of the esthetic object. The number of frames used is not determined by a mechanical rule, such as after every fixed number of seconds, but rather is determined by the esthetic judgment of a skilled interpreter who can identify meaningful differences between sampled frames. (See FIG. 2.)

In the case of a graphic display object (see FIG. 4), the elements are determined by describing and measuring audience response to the graphic object after controlled time exposures via a computerized interview. For example, the respondent might be automatically exposed to the test for three time exposures: ½ second, 1 second, and 4 seconds. After each exposure, respondents are asked to indicate where exactly on the page or screen he or she saw items and that data is recorded on a grid or recorded as a probability density function on a screen. Respondents are also asked to record what they saw. The information is then coded to determine how long it takes for viewers to register key elements such as a headline, a character, a package, a brand name, or the like. Depending on the purposes of the study, different time periods and a different number of exposures may be used. This method of data collection measures the order in which respondents take in or process the esthetic information contained in a display object.

Unlike other research methods for testing communication objects, which rely on verbal methods (i.e., "semantic" information, as described by Moles in *Information Theory and Esthetic Perception,* supra), this method relies on the "esthetic" vocabulary of the communication object itself to describe and measure how audiences cognitively and emotionally process the information contained in the communication object. Of necessity, therefore, this approach requires that visual esthetic objects be placed before the eyes of audience members or research respondents.

Figure 7:
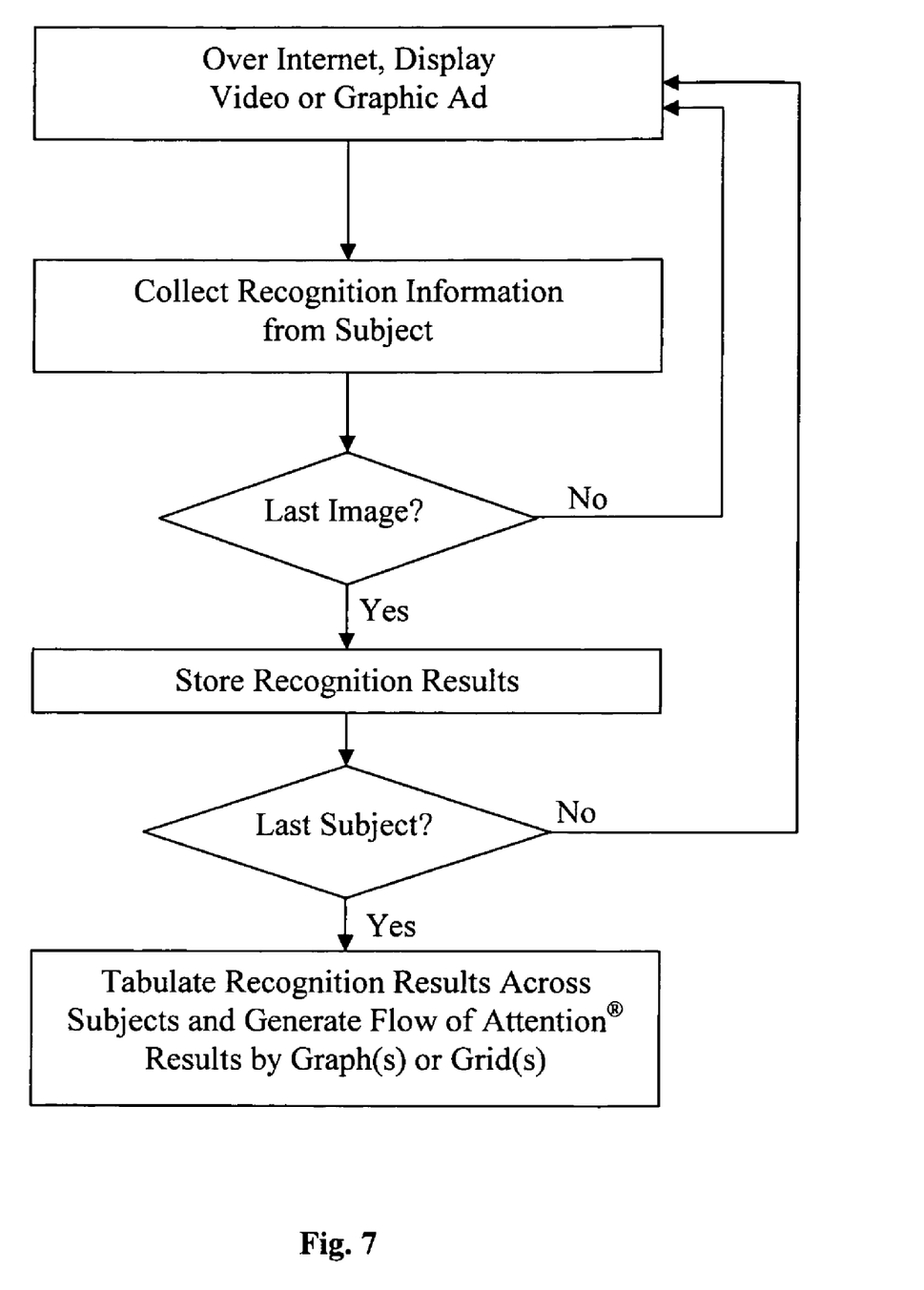
FIG. 7 is a flow diagram of the preferred Internet-enabled process of the invention for collecting audience attention information.

The Internet and interactive television make possible the collection of data on audience attention to esthetic objects utilizing recognition-based as opposed to recall-based research measures. The invention, again referring to FIG. 5 and also to FIG. 7, utilizes apparatus and software written to operate on Internet World Wide Web browsers or interactive television devices to expose "samples" of communication objects for use as a natural esthetic vocabulary in research data collection methods. These samples consist either of deconstructed video elements (i.e., frame grabs) or samples "in time" (i.e., controlled time exposures). These can then easily be manipulated by computer technology to interrogate, from a remote distance, an audience's response to a communication object in the natural environment of the home or place of business rather than in the artificial environment of a research center.

Figure 1:
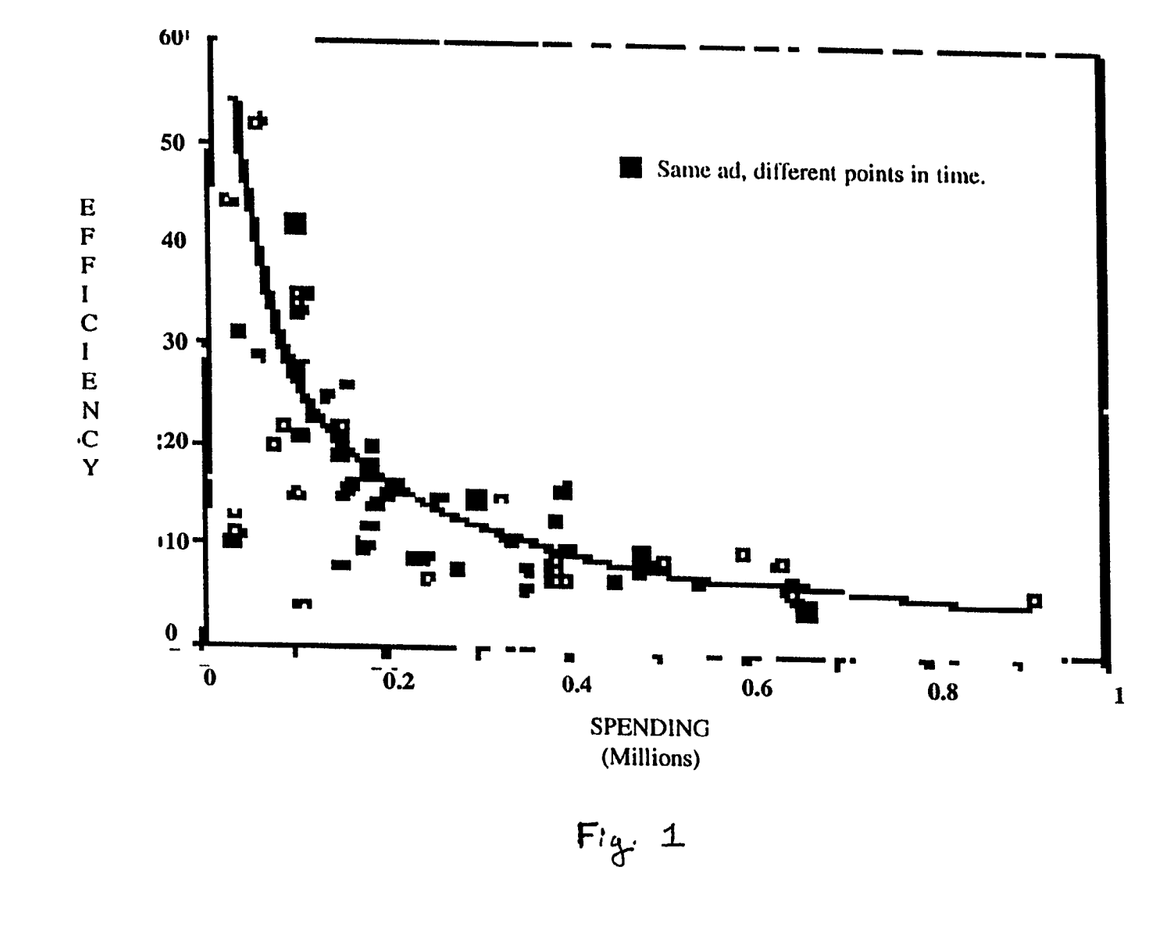
FIG. 1 is a graph showing the relationship between spending and efficiency in gaining awareness for a large number of television commercials of a single organization; because an audience recognition measure is used in the present invention, "wearout" for the same advertisement can be measured over time as a function of pending in market, rather than estimated by a theoretical model.

The invention is further of an automated system and method for using the Internet or interactive television for tracking audience awareness and response to television advertising. The method uses a recognition-based approach to research measurement as opposed to the recall-based approach used by many other research companies to track television advertising awareness. The importance of this approach is that it makes it possible for an advertiser to track the awareness of an individual advertisement embedded in a larger pool of television advertisements being aired simultaneously. This approach also makes it possible for an advertiser to track the "wear out" of individual commercials in real time (see FIG. 1), as opposed to current methods which use estimates for theoretical models.

Recognition of the television commercial, as a measure of audience awareness, is obtained by showing an audience member or respondent a storyboard (photoboard) of the advertisement or abbreviated video on a computer or television screen (see FIG. 5). This can be done via the Internet or interactive television.

The storyboard/abbreviated video approach makes use of a reduced-set of esthetic information from the original video in that only a small number of frames from the advertisement are included in the storyboard. However, research has shown that a viewing audience will give different levels of attention to different images in a television commercial (e.g., C. Young, et al., "Video Rhythms and Recall", *Journal of Advertising Research* 29, 3, pp. 22–25 (1989)). Therefore, without prior information as to which images in an advertisement are most memorable, the choice of images used in constructing a storyboard can severely affect the accuracy of the recognition-based measure obtained from use of a storyboard or abbreviated video stimulus.

Figure 3:
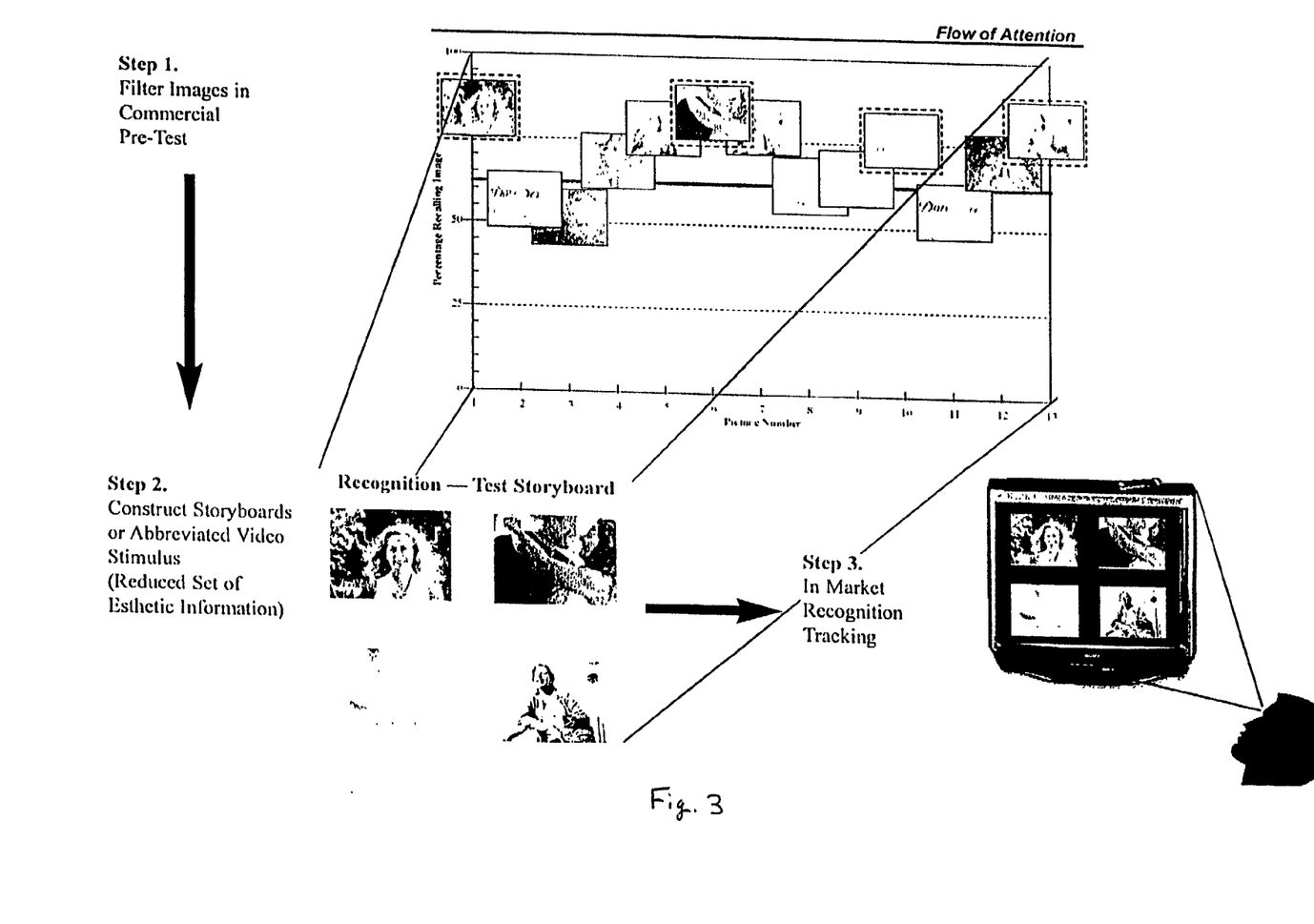
FIG. 3 illustrates Flow of Attention® information used to perform in-market tracking (prior art)

A filtering process must first be used in the choice of images selected for the storyboard. The filtering process used in this invention is to use the Picture Sorts® method, as employed in the Flow of Attention® graph of FIG. 2, to identify key images for use in the in-market tracking research. In other words, images scoring above some predetermined hurdle rate in the "forced-viewing" situation of a commercial pre-test, which measure show consumers cognitively process or attend to television image in a commercial in a non-cluttered environment, are those which are included in the storyboard or abbreviated video stimulus which is used to track attention to the commercial in the cluttered environment of the real world marketplace. (See FIG. 3.)

The effect of this filtering process is to reduce the measurement error around the storyboard-based recognition measure. As a result, the system for tracking audience awareness and response to television advertising is more accurate than it otherwise would be.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of collecting audience recognition information concerning a video presentation, the method comprising the steps of:
   displaying an entire video presentation to a plurality of subjects;
   subsequently inquiring of each of the subjects by computer whether each of a plurality of still images obtained from the video presentation are recognized by each of the subjects, the inquiring step taking place after the displaying step; and
   for each of the still images, tabulating a percentage of the subjects reporting recognition by remembrance of the still image in the inquiring step.

2. The method of claim 1 wherein the displaying and inquiring steps are performed on a computer local to each subject, wherein the tabulating step is performed on a central computer networked to each local computer.

3. The method of claim 1 additionally comprising the step of automatically generating by a computer a graph comprising each of the images.

4. The method of claim 1 further comprising the step of selecting a plurality of still images obtained from the video presentation according to meaningful differences between sampled frames.

5. The method of claim 2 additionally comprising the step of communicating results of the inquiring step to the central computer over the Internet.

6. The method of claim 3 wherein a position of each of the images on the graph is determined by the corresponding percentage generated in the tabulating step.

7. A method of collecting audience recognition information concerning a video or graphic presentation, the method comprising the steps of:
   displaying a video or graphic presentation to a plurality of subjects;
   after the displaying step, obtaining by an apparatus local to each subject audience recognition information from each of the subjects concerning a plurality of still images obtained from the video presentation;

communicating results of the obtaining step via a network to a central computer; and tabulating results of the obtaining step for all subjects.

8. The method of claim 7 wherein the displaying and obtaining steps are performed by an element selected from the group consisting of World Wide Web browsers, interactive television devices, and a combination thereof.

9. The method of claim 7 wherein the obtaining step comprises inquiring of each of the subjects whether each of a plurality of still images from a video presentation are recognized by each of the subjects, and the tabulating step comprises tabulating a percentage of the subjects reporting recognition of each of the images in the inquiring step.

10. The method of claim 7 further comprising the step of generating by a computer a graph or grid comprising at least one image from the presentation.

11. The method of claim 10 wherein characteristics of the at least one image are determined by results of the tabulating step.

12. A method of collecting in-market audience recognition information concerning a video presentation, the method comprising the steps of:
displaying a video presentation to a first plurality of subjects;
inquiring of each of the first plurality of subjects whether each of a plurality of still images obtained from the video presentation are recognized by each of the first plurality of subjects;
for each of the images, tabulating a percentage of the first plurality of subjects reporting recognition of the image in the inquiring step;
generating a graph comprising each of the images, wherein a position of each of the images on the graph is determined by the corresponding percentage generated in the tabulating step;
after the generating step, creating an abbreviated presentation containing a subset of the images;
after introduction of the video presentation via an advertising campaign, displaying the abbreviated presentation to a second plurality of subjects in a market targeted by the advertising campaign; and
inquiring of each of the second plurality of subjects whether the abbreviated presentation is recognized by each of the second plurality of subjects.

13. The method of claim 12 wherein the creating step comprises creating a storyboard comprising still images.

14. The method of claim 12 wherein the creating step comprises creating an abbreviated video presentation comprising a subset of the video presentation.

15. The method of claim 12 further comprising the step of selecting a plurality of still images obtained from the video presentation according to meaningful differences between sampled frames.

16. A system for collecting audience recognition information concerning a video presentation, comprising:
an apparatus for displaying an entire video presentation to a plurality of subjects;
a computer apparatus for subsequently inquiring of each of the subjects whether each of a plurality of still images obtained from the video presentation are recognized by each of the subjects, the inquiring taking place after the video presentation has been displayed; and
a central computer for tabulating for each of the still images, a percentage of the subjects reporting recognition by remembrance of the still image to the inquiring apparatus.

17. The system of claim 16 wherein the displaying and inquiring apparatuses comprise one or more computers local to each subject.

18. The system of claim 16 further comprising a computer for automatically generating a graph comprising each of the images.

19. The system of claim 17 additionally comprising an apparatus for communicating results generated by the inquiring apparatus to the central computer over the Internet.

20. The system of claim 18 wherein a position of each of the images on the graph is determined by the corresponding percentage generated by the tabulating means.

21. A system for collecting audience recognition information concerning a video or graphic presentation, comprising:
an apparatus for displaying a video or graphic presentation to a plurality of subjects;
an apparatus local to each subject for obtaining audience recognition information from each of the subjects concerning a plurality of still images obtained from the video presentation;
a network for communicating results generated by the obtaining apparatus to a central computer; and
an apparatus for tabulating results generated by the obtaining means for all subjects.

22. The system of claim 21 wherein the displaying and obtaining apparatus comprise one or more of the elements selected from the group consisting of World Wide Web browsers, interactive television devices, and a combination thereof.

23. The system of claim 21 wherein the obtaining apparatus comprises an apparatus for inquiring of each of the subjects whether each of a plurality of still images from a video presentation are recognized by each of the subjects, and the tabulating apparatus comprises an apparatus for tabulating a percentage of the subjects reporting recognition of each of the images to the inquiring apparatus.

24. The system of claim 21 further comprising a computer for generating a graph or grid comprising at least one image from the presentation.

25. The system of claim 24 wherein characteristics of the at least one image are determined by results generated by the tabulating means.

26. A system for collecting in-market audience recognition information concerning a video presentation, comprising:
an apparatus for displaying a video presentation to a first plurality of subjects;
an apparatus for inquiring of each of the first plurality of subjects whether each of a plurality of still images obtained from the video presentation are recognized by each of the first plurality of subjects;
an apparatus for tabulating a percentage of the first plurality of subjects reporting recognition of the image to the inquiring apparatus;
an apparatus for generating a graph comprising each of the images, wherein a position of each of the images on the graph is determined by the corresponding percentage generated by the tabulating apparatus;
an apparatus for creating an abbreviated presentation containing a subset of the images
an apparatus for, after introduction of the video presentation via an advertising campaign, displaying the abbreviated presentation to a second plurality of subjects in a market targeted by the advertising campaign; and an apparatus for inquiring of each of the second plurality of subjects whether the abbreviated presentation is recognized by each of the second plurality of subjects.

27. The system of claim 26 wherein the creating apparatus comprises an apparatus for creating a storyboard comprising still images.

28. The system of claim 26 wherein the creating apparatus comprises an apparatus for creating an abbreviated video presentation comprising a subset of the video presentation.

29. A method of collecting audience recognition information concerning a video or graphic presentation, the method comprising the steps of:

displaying a video or graphic presentation to a plurality of subjects, the displaying step comprising displaying a graphic presentation for a duration of less than one minute;

obtaining by an apparatus local to each subject audience recognition information from each of the subjects concerning a plurality of still images obtained from the video presentation, the obtaining step comprising inquiring of each of the plurality of subjects which of the still images are recognized;

communicating results of the obtaining step via a network to a central computer;

tabulating results of the obtaining step for all subjects, the tabulating step comprising determining for each of the portions a percentage of the subjects recognizing the portion in the obtaining step; and generating by a computer a graph or grid comprising at least one image from the presentation, wherein characteristics of the at least one image are determined by results of the tabulating step, the generating step comprising automatically generating by a computer the presentation overlaid with a grid, wherein a brightness of portions of the presentation are determined by results of the tabulating step.

30. The method of claim 29 wherein the step of communicating results via a network comprises communicating results via the Internet.

31. The method of claim 29 wherein the displaying and obtaining steps are performed by an element selected from the group consisting of World Wide Web browsers, interactive television devices, and a combination thereof.

32. A system for collecting and displaying audience recognition information concerning a video or graphic presentation, comprising:

an apparatus for displaying a video or graphic presentation to a plurality of subjects the displaying means comprising means for displaying a graphic presentation for a duration of less than one minute;

an apparatus local to each subject for obtaining audience recognition information from each of the subjects concerning a plurality of still images obtained from the video presentation, the obtaining means comprising means for inquiring of each of the plurality of subjects which of the still images are recognized;

a network for communicating results generated by the obtaining means to a central computer;

an apparatus for tabulating results generated by the obtaining apparatus for all subjects, the tabulating apparatus comprising an apparatus for determining for each of the portions a percentage of the subjects recognizing the portion to the inquiring apparatus; and a computer for generating a graph or grid comprising at least one image from the presentation, wherein characteristics of the at least one image are determined by results generated by the tabulating apparatus, the generating apparatus comprises a computer for automatically generating the presentation overlaid with a grid, wherein a brightness of portions of the presentation are determined by results generated by the tabulating apparatus.

33. The system of claim 32 wherein the network for communicating results comprises the Internet.

34. The system of claim 32 wherein the displaying and obtaining apparatuses are performed by an element selected from the group consisting of World Wide Web browsers, interactive television devices, and a combination thereof.

* * * * *